United States Patent [19]

Fairhurst et al.

[11] Patent Number: 5,285,283
[45] Date of Patent: Feb. 8, 1994

[54] DEPTH SIGNAL PROCESSING IN A VIDEO SWITCHER

[75] Inventors: Jon A. Fairhurst; Jay S. Baker, both of Grass Valley; Mark M. Baldassari, Penn Valley, all of Calif.

[73] Assignee: The Grass Valley Group, Inc., Nevada City, Calif.

[21] Appl. No.: 904,404

[22] Filed: Jun. 25, 1992

[51] Int. Cl.⁵ .............................. H04N 5/268
[52] U.S. Cl. .................... 348/705; 348/587
[58] Field of Search .......... 358/181, 183, 185, 160, 358/22; H04N 5/222, 5/262, 5/268

[56] References Cited

U.S. PATENT DOCUMENTS

| 4,684,990 | 8/1987 | Oxley | 358/183 |
| 4,774,583 | 9/1988 | Kellar | 358/183 |
| 4,853,784 | 8/1989 | Abt et al. | 358/181 |
| 5,121,210 | 6/1992 | Hirayama | 358/183 |

FOREIGN PATENT DOCUMENTS

2252009 7/1992 United Kingdom ........ H04N 5/262

*Primary Examiner*—Mark R. Powell
*Assistant Examiner*—Chris Grant
*Attorney, Agent, or Firm*—Francis I. Gray

[57] ABSTRACT

A switcher with depth processing includes a depth processor module. External depth data, or internally generated depth data, are input to the depth processor to generate a priority signal for combining key video signals as layers between a background and a foreground video signal. Further a composite depth signal is generated for the combined key video signals for subsequent processing so that additional key video layers may be intersected and intertwined with the key video layers in the combined video signals.

16 Claims, 9 Drawing Sheets

DEPTH SIGNAL PROCESSING IN A VIDEO SWITCHER

BACKGROUND OF THE INVENTION

The present invention relates to digital video switchers, and more particularly to depth signal processing in a video switcher that includes depth based combining of video signals as well as processed depth outputs.

In the D1 4:2:2 digital video format three components of video data are transmitted or received: a luminance component (Y) for each pixel and two chrominance components (B-Y, R-Y) associated with each luminance component for alternate pixels, or picture elements. Therefore the sequence is: B1-Y1, Y1, R1-Y1; Y2; B3-Y3, Y3, R3-Y3; Y4; etc. Since each pixel has a luminance component, the luminance component is full bandwidth. However, only every other pixel has the chrominance components, so the chrominance components are one-half bandwidth. In this format a key source signal commonly is represented by using the Y-channel of the digital video stream. The Kaleidoscope digital video effects (video manipulation) product, the Kadenza digital switcher product and the Graphics Factory graphics generator product, all manufactured by The Grass Valley Group, Inc. of Grass Valley, Calif., United States of America, provide for depth information in the chrominance channels of the D1 channel containing the key source signal. The depth information ranges from full background (00000h) through normal screen depth (20000h) to full foreground (FFFFFh). Since the depth information is contained in the chrominance portion, it is in half-bandwidth form, i.e., two samples are needed for a complete depth sample and depth samples are provided for alternate pixels.

In a conventional small digital switcher there are generally one or more background signals, two video signals with associated key signals and a foreground signal as inputs. The two key video signals, KEY1 and KEY2, have a fixed priority with respect to each other so that one or the other of the video signals is always in front of the other as determined by such priority. The switcher combines the various input signals as layers, with the background layer underneath the other layers and the foreground layer over the other layers. The video layers lie between the foreground and background layers, with their relationship to each other, i.e., which layer is on top of the other, determined by the priority. The combining of these video layers is referred to as compositing. However once the layers have been combined, it is not possible to insert a new layer between the existing layers in a subsequent pass through the switcher. The new layers may only be placed in front of or behind the existing combined layers.

What is desired is processing of the video layers using depth information to provide dynamic key priority so that video layers may intersect or be placed at any depth with respect to prior composited video layers.

SUMMARY OF THE INVENTION

Accordingly the present invention provides depth processing in a video switcher that includes depth based combining of video signals as well as processed depth outputs. External depth signals associated with input video signals, or internally generated depth signals, are used to determine the relationship between video layers located between a bottom background layer and a top foreground layer.

The depth signals are converted to full-bandwidth signals and input to a priority signal generator to produce a priority signal for combining the video signals that make up the video layers. The depth signals are also defined with edges and body by respective key signals for the video layers. The defined depth signals are non-additively mixed to form a composite depth signal for the combined video layers. Finally the foreground signal also is provided with a defined depth signal and combined with the composite depth signal to produce a program depth signal for an output video signal. The respective key signals, associated video signals, background video signals, foreground key signal and priority signal are input to a mixer to generate the output video signal.

The objects, advantages and other novel features of the present invention are apparent from the following detailed description when read in conjunction with the appended claims and attached drawing.

DESCRIPTION OF THE PREFERRED EMBODIMENT

Figure 1A:
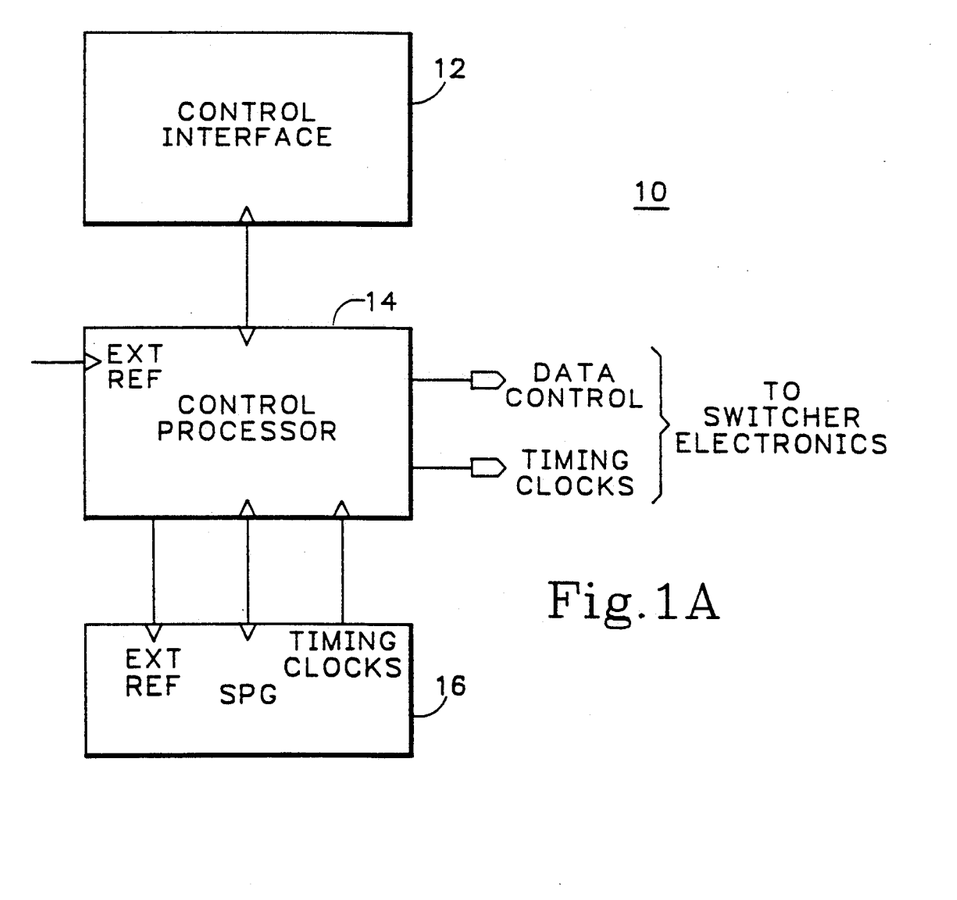
FIGS. 1a, 1b and 1c form a block diagram view of a depth processing switcher according to the present invention.
Figure 1B:
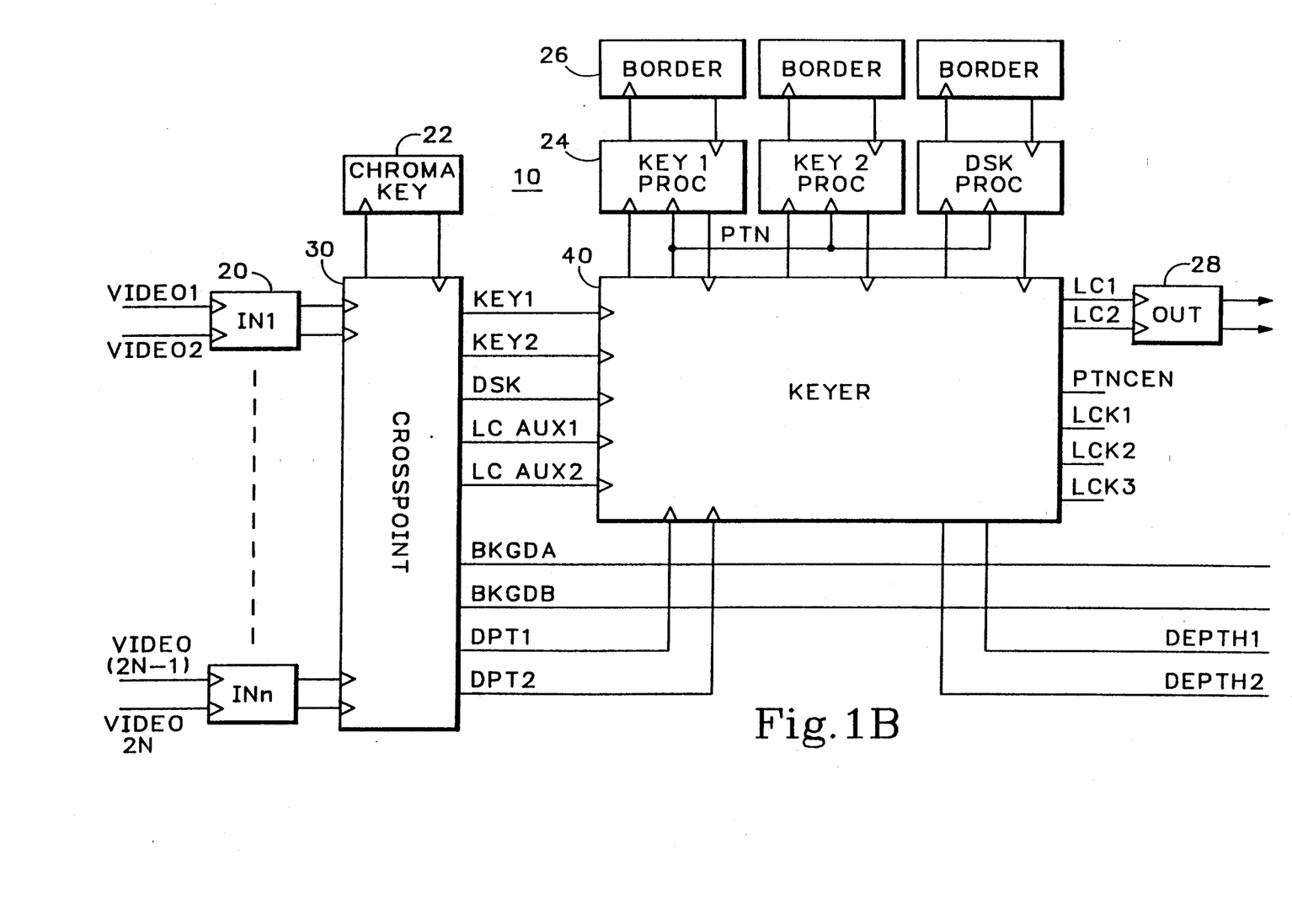
Figure 1C:
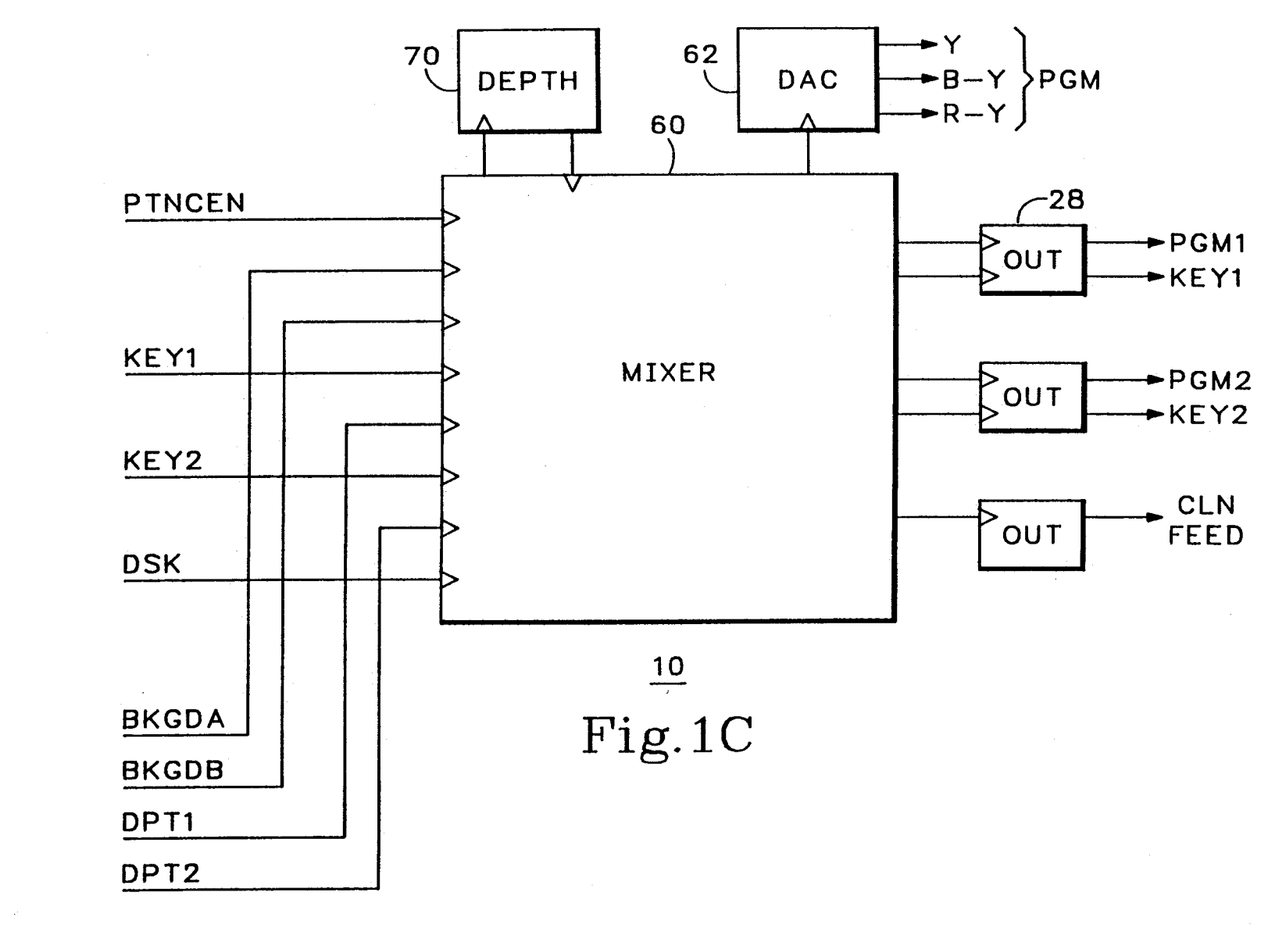

Referring now to FIGS. 1a, b and c a small digital switcher 10 according to the present invention is shown. An operator interacts with the switcher 10 via a control interface panel 12 having conventional knobs, buttons and slider controls. A control processor 14 receives and interprets operator inputs to the control interface panel 12 as commands and data for the switcher electronics. The control processor 14 then transmits information back to the control interface panel 12 to provide feedback to the operator. The control processor 14 also receives an external reference signal, such as black burst or the like, that is routed to a sync processing generator (SPG) 16. The SPG 16 provides clocks and timing signals required by the control processor 14 and the switcher electronics.

A plurality of video signals are input as pairs of signals into a plurality of input circuit modules 20. The pair of video signals may be two different video images, a single video image and key, or a single video image and key/depth. Each input circuit module 20 translates the input signals to the appropriate logic levels required by the switcher electronics, such as CMOS logic levels. The input circuit modules 20 may also provide for serial to parallel data conversion depending upon the type of internal architecture of the switcher 10. The input video signals are then input to a crosspoint matrix 30 that, under control of the control processor 14, switches any input video signal to any internal bus output from the matrix. Associated with the crosspoint matrix 30 are matte generators (not shown) that may be used to replace any input signal with a predetermined value, including providing an internal depth value on the appropriate chroma line(s) where no external depth value is provided.

Figure 2A:
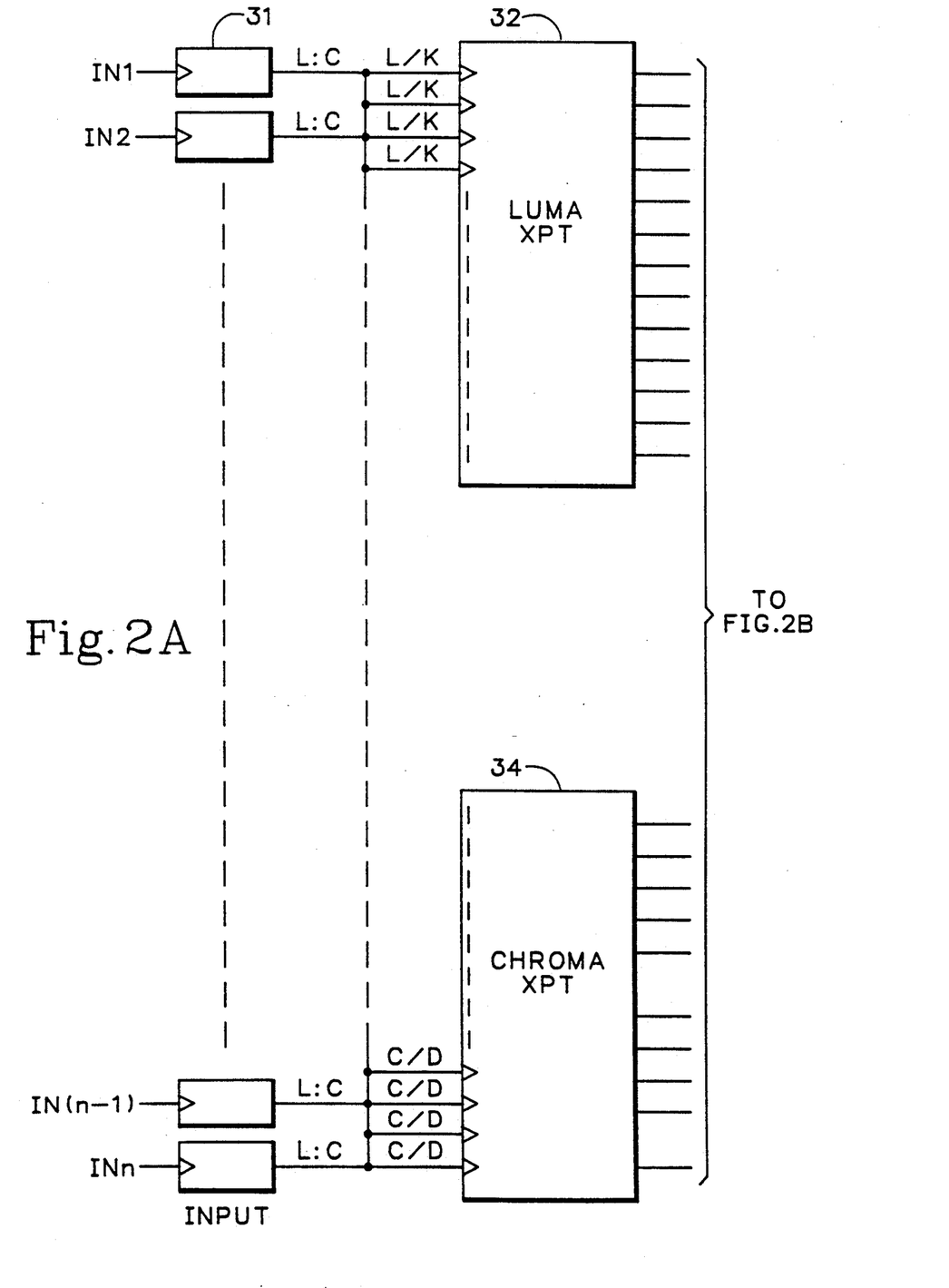
FIGS. 2A and 2B are block diagrams view of a crosspoint matrix for the depth processing switcher according to the present invention.
Figure 2B:
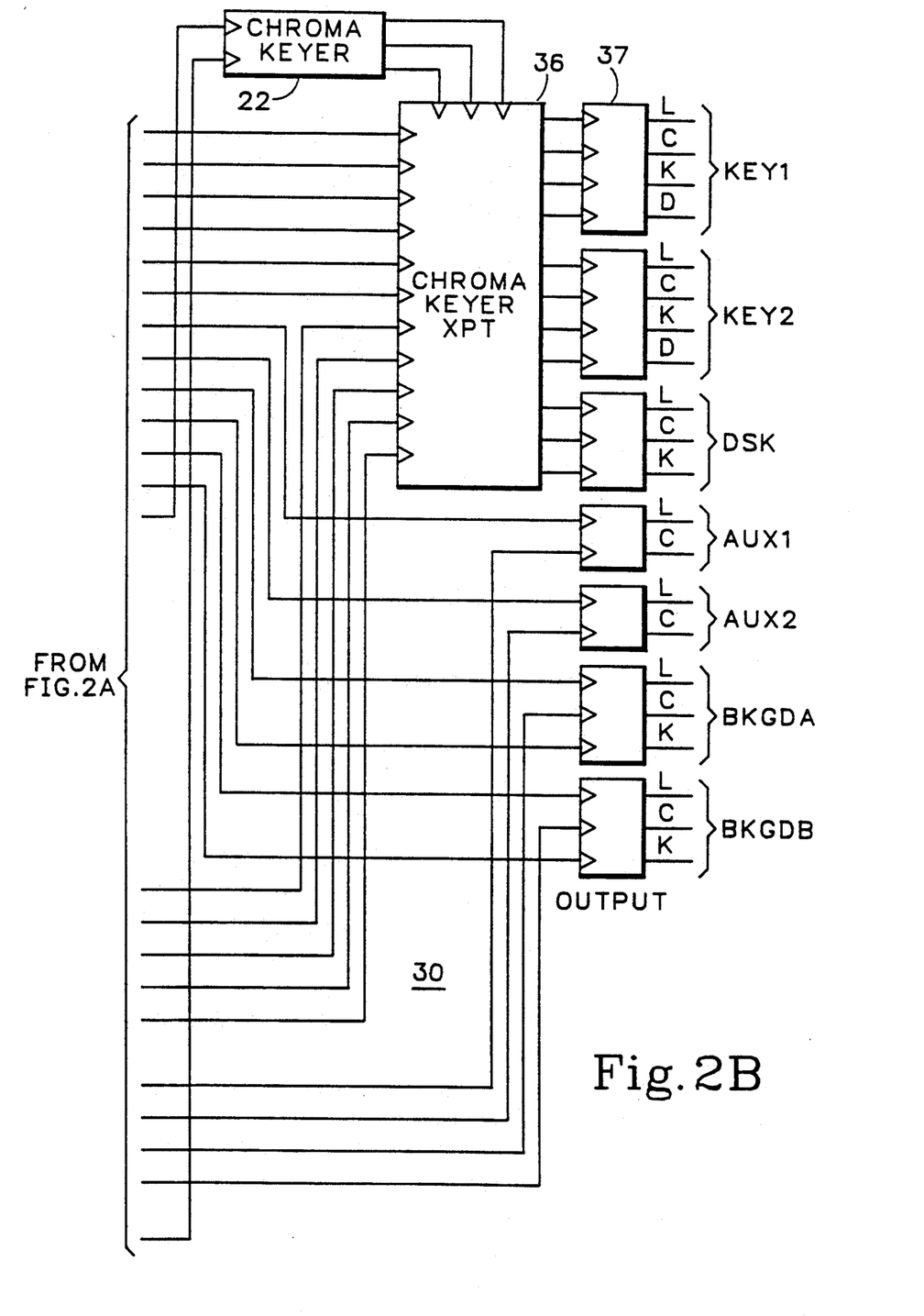

As shown in FIG. 2 the crosspoint matrix 30 has a pair of internal crosspoints 32, 34, one for luminance/key data and the other for chrominance/depth data. The input video signals are separated into luma L and chroma C channels by a plurality of crosspoint input circuits 31, with the luma channels being routed to the luma internal crosspoint 32 and the chroma channels being routed to the chroma internal crosspoint 34. One luminance and one chrominance output from each of the luma and chroma crosspoints 32, 34 are routed to an optional chroma keyer 22 to generate a chroma key signal. The luminance, chrominance and chroma key signals from the chroma keyer 22 are then input together with appropriate luminance and chrominance outputs from the luma and chroma crosspoints 32, 34 to a chroma keyer crosspoint 36. The inputs to the chroma keyer crosspoint 36 are in the form of pairs of luminance and key signals from the luma crosspoint 32 for each video layer plus foreground video of the switcher 10, and in the form of pairs of chrominance and depth signals from the chroma crosspoint 34 for each video layer with an additional chrominance signal for the foreground video. The outputs of the chroma keyer crosspoint 36 and the remaining outputs from the luma and chroma crosspoints 32, 34 are input to a plurality of crosspoint output circuits 37 that provide the video channel outputs to the internal data buses of the switcher 10.

Figure 3:
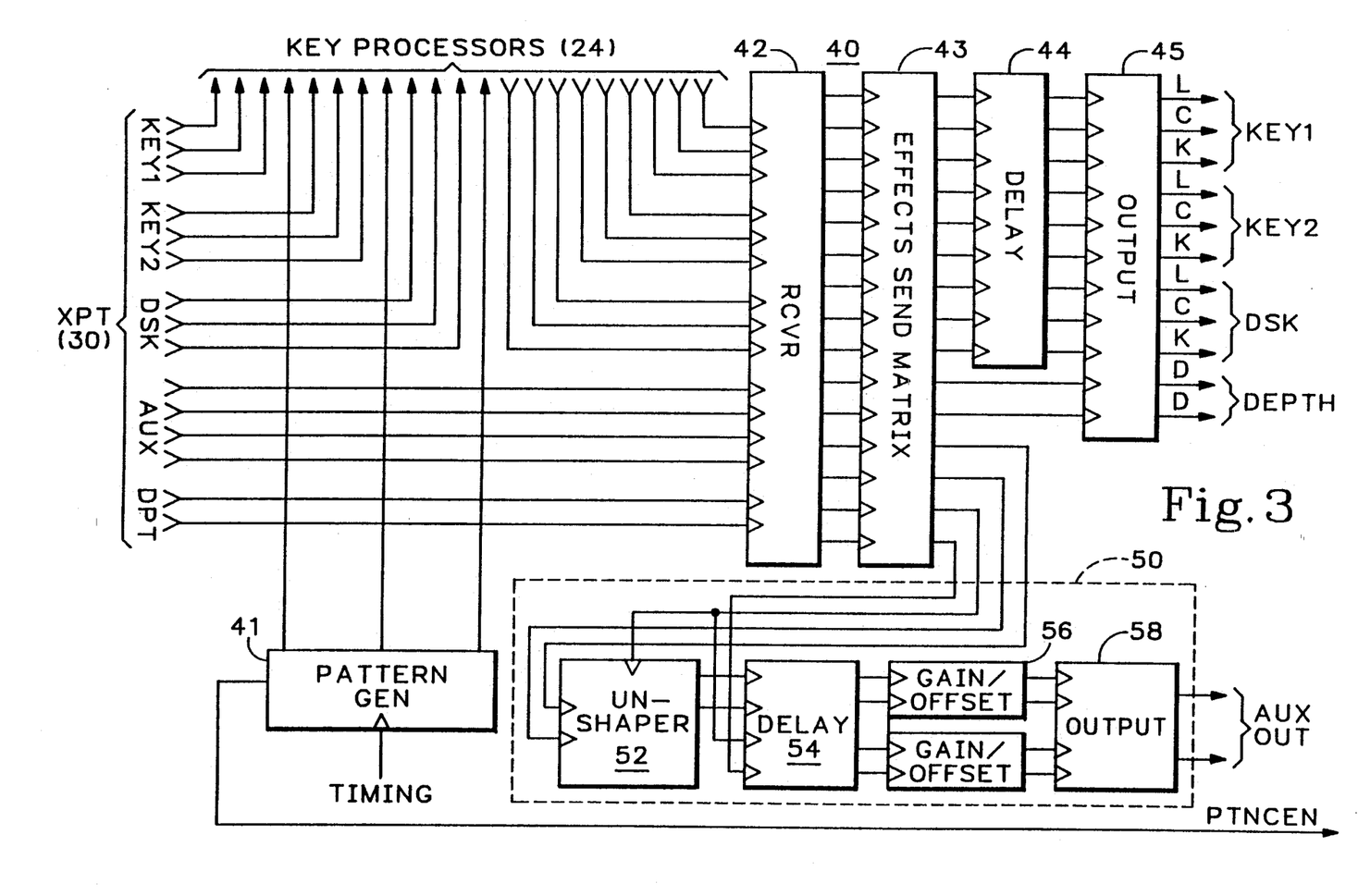
FIG. 3 is a block diagram view of a keyer module for the depth processing switcher according to the present invention.

The two key video layers KEY1, KEY2, without the depth data, and the foreground video DSK from the crosspoint matrix 30 are input to a keyer module 40. Also input to the keyer module 40 are two auxiliary video channels AUX1, AUX2 and the two separate depth signals DPT1, DPT2 for the key video layers KEY1, KEY2, as shown in FIG. 1B. Associated with the keyer module 40 are key processors 24, one for each video layer and the foreground video, with associated borderline generators 26. As shown in FIG. 3 the key video layers KEY1, KEY2 and the foreground video DSK are routed directly to the key processors 24 together with an associated pattern signal from a pattern generator 41. The outputs from the key processors 24 and the auxiliary video AUX1, AUX2 and depth DPT1, DPT2 signals are input to an effects send matrix 43 via appropriate buffer receivers 42. The effects send matrix 43 selects signals to be processed by a send effects channel 50 to produce an auxiliary output. The remaining signals from the effects send matrix 43 are input directly, or via a delay circuit 44, to a keyer module output circuit 45 to produce the key video layers KEY1, KEY2, foreground video DSK and depth signals for further processing. As in the crosspoint matrix 30 the effects send matrix 43 also has matte generators associated with it to provide a predetermined value for the depth signals DPT1, DPT2 output from the keyer module 40 where no external depth is associated with the video layers KEY1, KEY2 that also are output from the keyer module.

The output from the effects send matrix 43 for the send effects channel 50 are in the form of pairs of signals, with one pair having luminance and chrominance and the other pair having either luminance and chrominance or key and depth. The first pair of luminance and chrominance are input to an unshaping circuit 52 together with the key from the second pair if appropriate. The output from the unshaping circuit 52 and the second pair of signals are input to a delay circuit 54, then through gain offset circuits 56 to a send effects output circuit 58 to produce an auxiliary output. As shown in FIG. 1B, the auxiliary output is converted by one of a plurality of output circuits 28 of the switcher 10 to appropriate signals for processing by an external device, such as the Kaleidoscope digital video effects device, before re-entry into the switcher as one or more of the video input signals.

The key video layers, foreground video and depth signals from the keyer module 40 together with the background videos BKGD1, BKGD2 from the crosspoint matrix 30 are input to a mixer 60, as shown in FIG. 1C, for combining to produce a desired program video output signal as indicated by the operator via the control interface panel 12. Also input to the mixer 60 is a center of pattern signal PTNGEN from the pattern generator 41 of the keyer module 40. The program video output signal is input to output circuits 28 to provide two program video outputs with associated key and a clean feed signal CLN_FEED in the same format as the original input video signals. Also the output from the mixer 60 may be input to a digital to analog converter 62 for conversion to analog component video. The analog component video may then be displayed on a program monitor (not shown).

Figure 4:
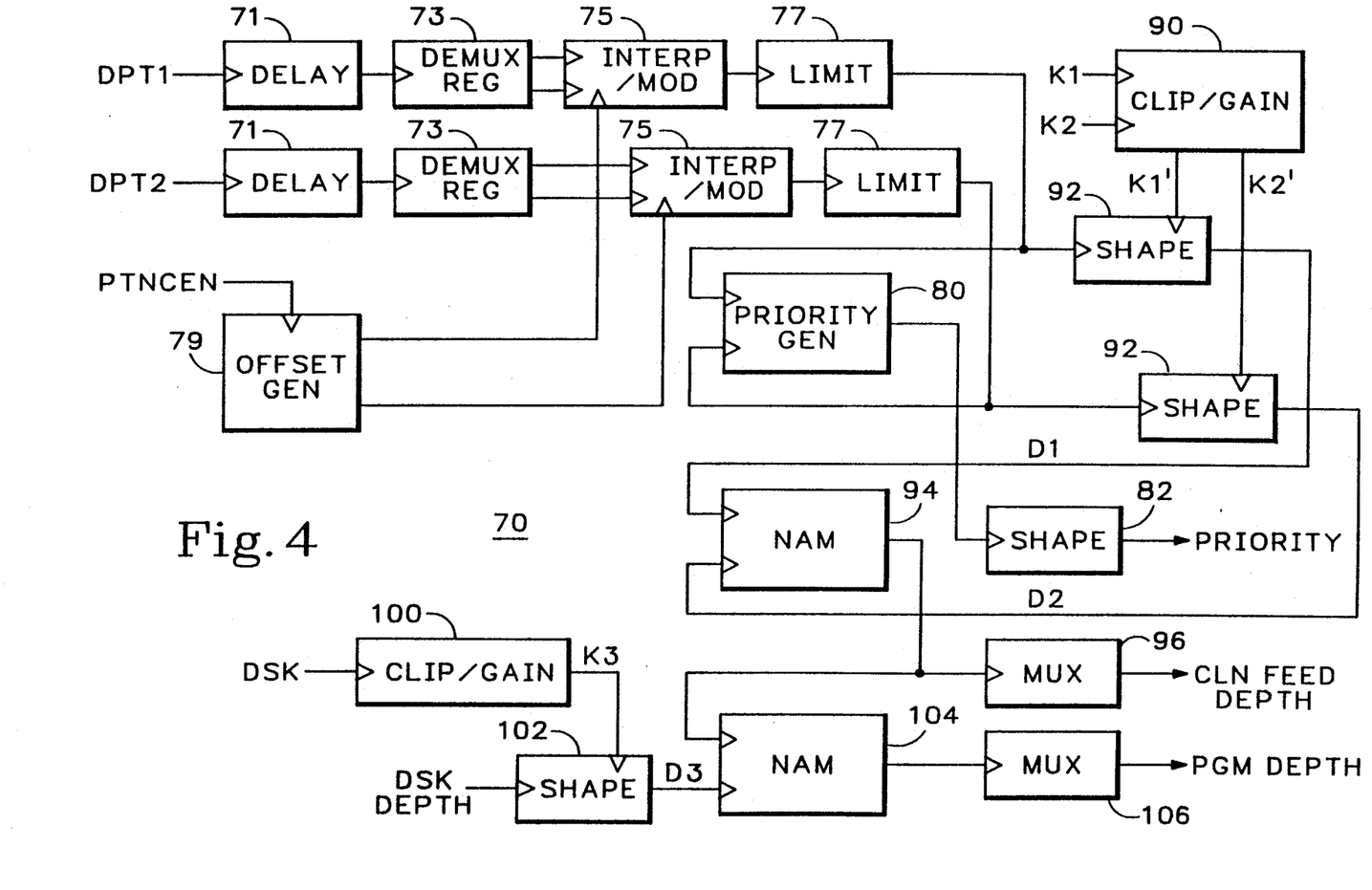
FIG. 4 is a block diagram view of a depth processor for the depth processing switcher according to the present invention.

The depth signals DPT1, DPT2, together with the PTNGEN signal as a transition signal, are routed by the mixer 60 directly to a depth module 70. As shown in FIG. 4 the depth signals are input to respective depth channels, each having a delay circuit 71, a demultiplexer register 73, an interpolator/modifier circuit 75, and a limiter 77 in series. The demultiplexer register 73 temporarily stores two depth data half-bandwidth words from alternate pixels to form a complete depth full-bandwidth word. The interpolator/modifier 75 determines the value of an intermediate depth full-bandwidth word between consecutive depth full-bandwidth words to provide a depth full-bandwidth word for each pixel of the video signal. An offset generator 79 in response to the transition signal PTNGEN adds or subtracts a depth value from the depth words to adjust the point of intersection between the two video layers. The limiters 77 prevent undershoot or overshoot of the depth word values. The two depth word signals from the limiters 77 are input to a priority generator 80 that subtracts the depth word signals from each other and multiplies the result by a softness factor provided from the control processor 14 that determines the softness of the transition at the intersection of the two key video layers. The resulting priority output is linear, but is clipped and S-shaped by a priority shaping circuit 82 to produce a dynamic priority signal PRIORITY for the mixer to combine the two key video layers.

Figure 5:
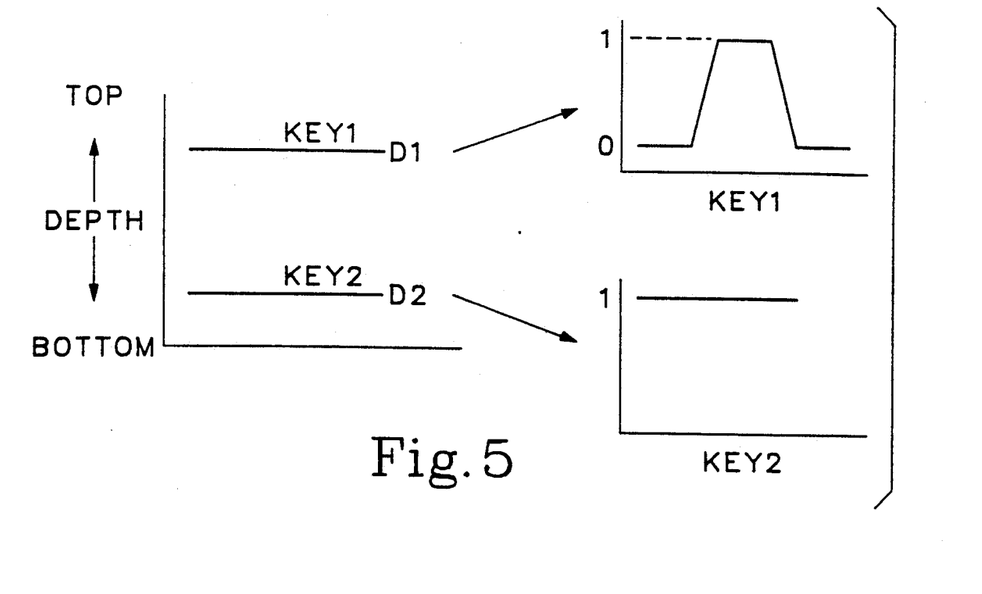
FIG. 5 is an illustration of depth and key signals associated with key video layers according to the present invention.
Figure 6:
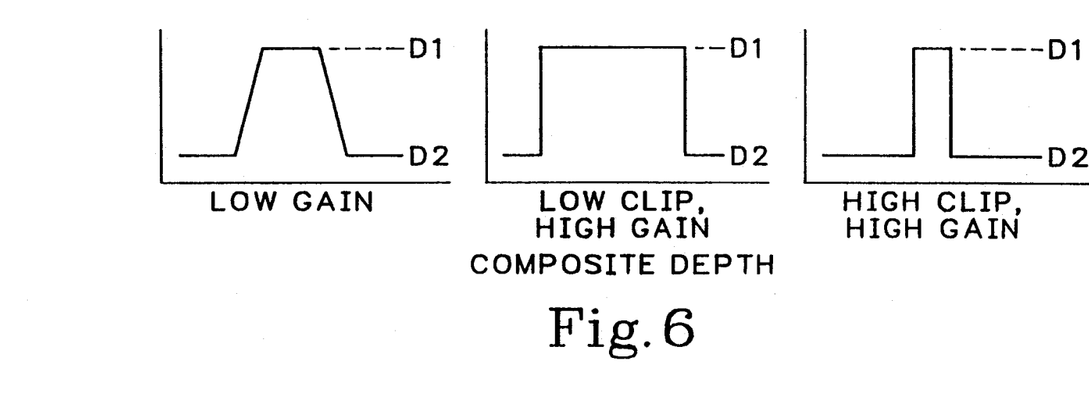
FIG. 6 is an illustration of different composite depth signals for the key video layers of FIG. 5 as a function of secondary clip and gain of the associated key signals according to the present invention.

Also input to the depth module 70 from the mixer 60 are the key signals K1, K2 from the video layers. These key signals have been previously clipped, gained and limited to control levels in order to define the edges and body of their respective key video layers. These key signals K1, K2 are now passed through another clip, gain and limiter circuit 90 to define depth edges and body. As shown in FIG. 5 the layers KEY1, KEY2 may have depth values that have KEY1 on top of KEY2, with K2 being a fixed constant "on" value and K1 having a variable value. The modified key signals K1', K2' are input to shaper circuits 92 where they multiply the depth signals from the limiters 77. The two defined depth signals D1, D2 from the shaper circuits 92 are input to a non-additive mixer (NAM) 94 to produce a clean feed depth signal for the combined key video layers. Referring now to FIG. 6, three different clip and gain characteristics produce three different composite or clean feed depth signals. By balancing the second clip and gain of the key signals K1, K2 aliasing may be minimized, by not using excessive gain, and the depth edge position is controlled. The clean feed depth signal is input to a multiplexer 96 to convert the full-bandwidth signal to a half-bandwidth clean feed depth signal compatible with the output digital video format.

Although the foreground video has no depth associated with it, its priority is always in front of the video layers, the program depth output needs to take the foreground video into consideration. Therefore the downstream key signal K3 is input to a clip, gain and limiter circuit 100 and multiplied in a shaper circuit 102 by a fixed DSK depth value from the control processor 14. The modified DSK depth signal D3 is input to another non-additive mixer 104 together with the clean feed depth signal from the first NAM 94 to produce a full-bandwidth program depth signal. This depth signal likewise is input to a multiplexer 106 to produce a half-bandwidth program depth signal compatible with the output digital format.

Figure 7:
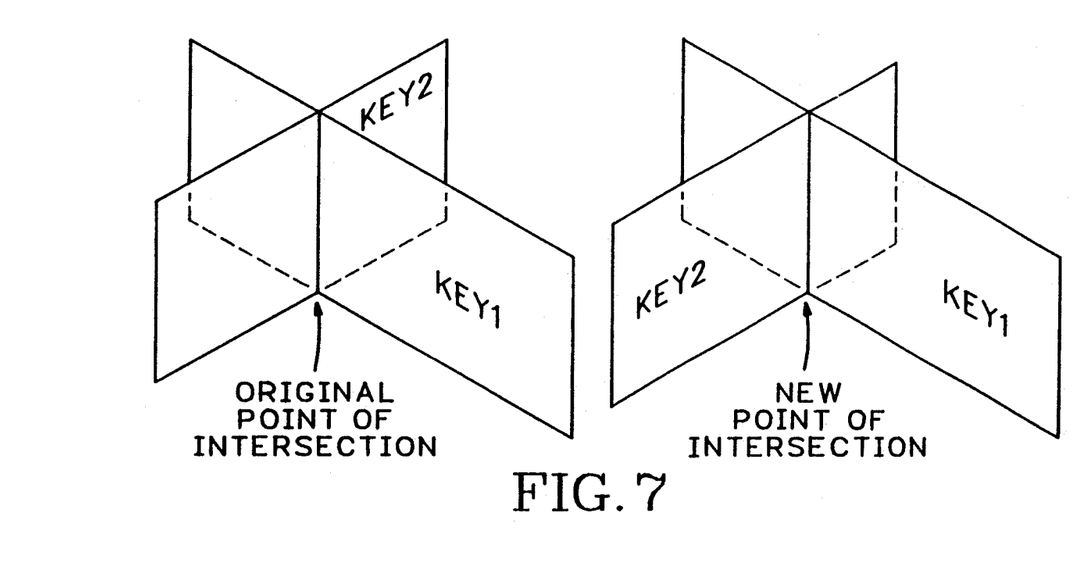
FIG. 7 is an illustration of the combining of key video layers having complex depth signals according to the present invention.

If the KEY2 layer is larger than and behind the KEY1 layer, and the KEY1 layer is larger than the DSK layer, and all layers have a flat depth, the resultant program depth signal resembles a three-tiered wedding cake. By using this program depth output and its associated video signal during another pass through the switcher 10, another input key video layer could have its depth set to be between any of the pre-existing layers. Given layers with complex depth shapes, the switcher 10 allows video layers to intersect and intertwine with one another, as shown in FIG. 7. By changing the depth offset from the offset generator 79 of either depth signal, the intersection point may be altered. The gain of the second clip and gain circuit 90 controls the softness of the intersection. Also each layer could have many depth planes, allowing a dense stack of video pictures, which would normally take many passes through a conventional switcher, to be done in a single pass.

Figure 8:
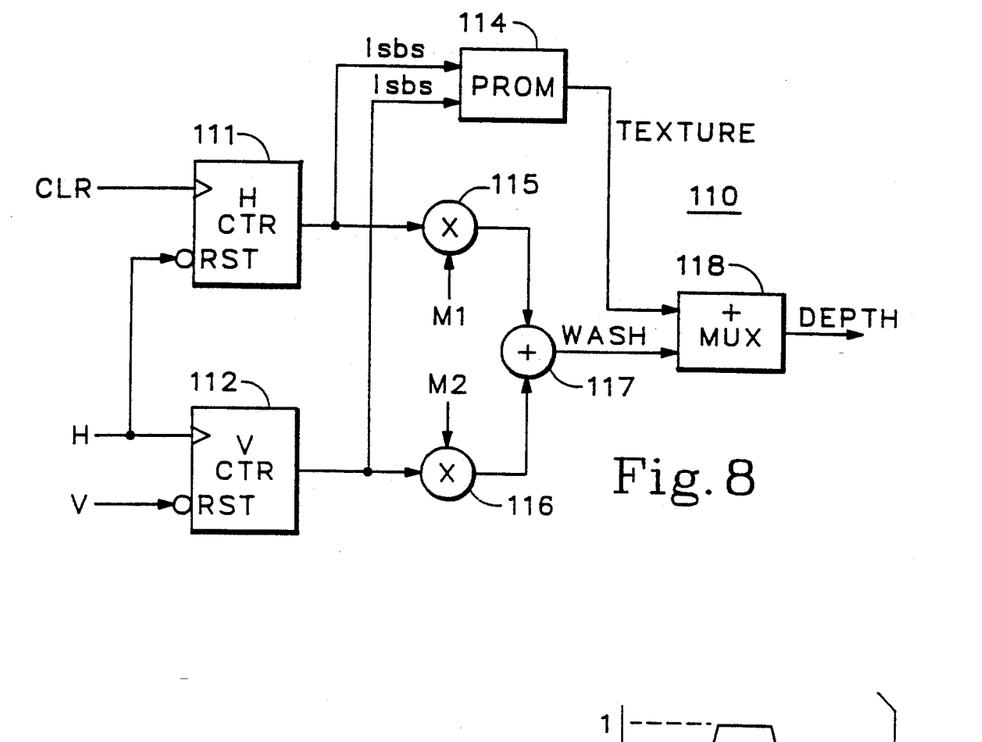
FIG. 8 is a block diagram view of a simple texture/wash generator for generating internal depth signals according to the present invention.

Finally as shown in FIG. 8 traditional wash and texture generators used to produce effects on video signals may be used to provide depth washes and textures for internally generated depth signals and offsets. Such a generator 110 in its simplest form includes a horizontal counter 111 that counts the pixel clock CLK and is reset after every horizontal line of pixels, and a vertical counter 112 that counts the horizontal line pulses H and is reset after every video field by the vertical field pulses V. The counters count from a preloaded value based upon a programmable modulo. The least significant bits from each counter are input as an address to a PROM 114 that outputs a texture signal, and the counts also are input to respective multipliers 115, 116. These multipliers 115, 116 are used to scale the H and V ramps represented by the counts by fixed values M1, M2. The outputs from the multipliers are input to an adder 117 that includes a limiter to produce a wash signal. The wash signal is input to an adder/multiplexer 118 together with the texture signal to produce either a texture, a wash, or a texture/wash combined depth signal. This allows the switcher 10 to create its own intersecting planes and seemingly three-dimensional effects without the need for an external graphics generator, such as the Graphics Factory graphics generator, or video manipulator, such as the Kaleidoscope digital video effects device.

Thus the present invention provides depth signal processing in a video switcher by using depth signals to generate a priority signal between video layers, and by generating a composite output depth signal for use in subsequent passes through the switcher.

What is claimed is:

1. A video switcher for producing an output video signal from a plurality of input video signals of the type having means for selectively routing the input video signals to a plurality of internal video buses, means coupled to the internal video buses for generating key signals for selected ones of the input video signals, and means for combining the input video signals with associated key signals as a function of a priority signal to produce the output signal further comprising means for generating the priority signal as a function of depth signals associated with the video signals.

2. A video switcher as recited in claim 1 wherein the priority signal generating means comprises:
   means for modifying each depth signal; and
   means for combining the modified depth signals to produce the priority signal.

3. A video switcher as recited in claim 2 wherein the priority signal generating means further comprises means for shaping the combined modified depth signals to produce the priority signal.

4. A video switcher as recited in claim 1 further comprising means for generating a composite depth signal for the output video signal.

5. A video switcher as recited in claim 4 wherein the composite depth signal generating means comprises:
   means for defining edges of each depth signal; and
   means for mixing the defined depth signals to produce the composite depth signal.

6. A video switcher as recited in claim 5 wherein the defining means comprises:
   means for modifying key signals associated with each depth signal; and
   means for shaping each depth signal as a function of the associated modified key signal to produce the defined depth signals.

7. A video switcher as recited in claim 6 wherein the modifying means comprises a clip and gain circuit having the key signals as inputs and the modified key signals as outputs.

8. A video switcher as recited in claim 6 wherein the shaping means comprises a multiplying circuit for multiplying each depth signal with the associated modified key signal to produce the defined depth signals.

9. A video switcher as recited in claim 5 wherein the mixing means comprises a non-addivitive mixer having the defined depth signals as inputs and the composite depth signal as output.

10. A video switcher as recited in claim 1 wherein the routing means comprises:
- a luminance crosspoint matrix to which are input luminance/key components of the input video signals;
- a chrominance crosspoint matrix to which are input chrominance/depth components of the input video signals;
- means for generating an internal depth signal; and
- means for selectively coupling the outputs from the luminance and chrominance crosspoint matrices and the internal depth signal to the internal video buses.

11. A video switcher as recited in claim 10 wherein the internal depth signal generating means comprises a matte generator for generating a fixed value as the internal depth signal.

12. A video switcher as recited in claim 10 wherein the internal depth signal generating means comprises a wash/texture generator for generating a complex value as the internal depth signal.

13. A video switcher as recited in claim 1 further comprising an effects send crosspoint matrix coupled to the internal video buses for selecting a video signal as an auxiliary output video signal for processing by an external device before being re-entered to the video switcher as one of the input video signals.

14. A video switcher as recited in claim 13 wherein the effects send crosspoint matrix comprises:
- a luminance crosspoint matrix to which are input luminance/key components of the video signals from the internal video buses;
- a chrominance crosspoint matrix to which are input chrominance/depth components of the video signals from the internal video buses;
- means for generating an internal depth signal;
- means for selectively coupling the outputs from the luminance and chrominance crosspoint matrices and the internal depth signal to the combining means; and
- means for routing at least one of the video signals including associated key and depth signals as the auxiliary output video signal.

15. A video switcher as recited in claim 14 wherein the internal depth signal generating means comprises a matte generator for generating a fixed value as the internal depth signal.

16. A video switcher as recited in claim 14 wherein the internal depth signal generating means comprises a wash/texture generator for generating a complex value as the internal depth signal.

* * * * *